(12) United States Patent
Arnold et al.

(10) Patent No.: US 6,889,471 B2
(45) Date of Patent: May 10, 2005

(54) POLYACRYLAMIDE SUSPENSIONS FOR SOIL CONDITIONING

(76) Inventors: Charles A. Arnold, 4650 S. Julian St., Englewood, CO (US) 80110; Arthur Wallace, 10215 Clematis Ct., Los Angeles, CA (US) 90077

( * ) Notice: Subject to any disclaimer, the term of this patent is extended or adjusted under 35 U.S.C. 154(b) by 384 days.

(21) Appl. No.: 09/843,608

(22) Filed: Apr. 26, 2001

(65) Prior Publication Data

US 2002/0095965 A1 Jul. 25, 2002

Related U.S. Application Data

(60) Continuation-in-part of application No. 09/356,271, filed on Jul. 16, 1999, now Pat. No. 6,395,051, said application No. 09/843,608, is a continuation-in-part of application No. 09/694,708, filed on Oct. 23, 2000, now abandoned, which is a continuation of application No. 09/290,483, filed on Apr. 12, 1999, now Pat. No. 6,135,170, which is a division of application No. 08/897,015, filed on Jul. 18, 1997, now abandoned.

(60) Provisional application No. 60/098,269, filed on Jul. 17, 1998.

(51) Int. Cl.$^7$ ............................ C05C 11/00; C09H 3/00
(52) U.S. Cl. ........................... 47/58.1 SC; 47/DIG. 10; 71/27; 71/28; 71/58; 71/63; 71/64.08; 71/903; 252/363.5; 526/310
(58) Field of Search ............................... 71/64.08, 903, 71/27, 28, 58, 63; 47/58.1 SC, DIG. 10; 252/363.5; 526/310

(56) References Cited

U.S. PATENT DOCUMENTS

| | | |
|---|---|---|
| 2,625,529 A | 1/1953 | Hedrick et al. |
| 2,652,380 A | 9/1953 | Hedrick et al. |
| 3,900,378 A | 8/1975 | Yen et al. |
| 4,035,317 A | 7/1977 | Gershberg |
| 4,214,712 A | 7/1980 | van Hoorn |
| 4,218,012 A | 8/1980 | Hamza et al. |
| 4,518,261 A | 5/1985 | Sekimoto et al. |
| 5,450,985 A | 9/1995 | Meuleman |
| 5,548,020 A | 8/1996 | Santini et al. |
| 5,580,168 A | 12/1996 | Alireza et al. |
| 5,637,556 A | 6/1997 | Argillier et al. |
| 2002/0006874 A1 * | 1/2002 | Brigance et al. |

FOREIGN PATENT DOCUMENTS

| | | | |
|---|---|---|---|
| EP | 0181983 A | | 5/1986 |
| EP | 0379379 | * | 5/1990 |
| GB | 289889 | | 5/1929 |
| GB | 2088248 A | | 6/1982 |
| GB | 2267398 A | | 5/1986 |
| JP | 141693 | | 6/1986 |

OTHER PUBLICATIONS

A. Wallace et al., Need for Solution or Exchange Calcium and/or Critical EC Level for Flocculation.
R.E. Sojka et al., Water Management with Multiple Applications of Polyacrylamide in Furrow Irrigati.
M. Ben–Hur et al., "Polymer Effects on Water Infiltration and Soil Aggregation," Soil Sci. Soc. Am.
A. Wallace et al., "effects of Very Low Rates of Synthetic Soil Conditions on Soils,".

* cited by examiner

Primary Examiner—Wayne A. Langel
(74) Attorney, Agent, or Firm—Bose McKinney & Evans LLP

(57) ABSTRACT

A stable aqueous suspension of water-soluble polyacrylamide particles is in a saturated solution of an ammonium salt. The polyacrylamide particles are characterized by a particle size of about −150 mesh, and preferably −270 mesh, with −400 mesh most preferred. The suspension is at least about 2.5% by weight polyacrylamide. When the ammonium salt is ammonium sulfate, PAM concentrations as high as about 15% by weight can be achieved while still being easily flowable. The suspension is made by stirring the small particle PAM into the saturated ammonium salt solution. The PAM can be quickly dissolved to form a less concentrated PAM solution by adding the suspension to water or to a dilute solution, which can include calcium salts or other soil enhancers.

25 Claims, No Drawings

POLYACRYLAMIDE SUSPENSIONS FOR SOIL CONDITIONING

CROSS-REFERENCE TO RELATED PATENT APPLICATIONS

This application is a continuation in part of application Ser. No. 09/356,271, filed Jul. 16, 1999, to Charles A. Arnold and Arthur Wallace and entitled Small Particle Polyacrylamide for Soil Conditioning, U.S. Pat. No. 6,395,051, which claims the benefit of Provisional Ser. No. 60/093,269, filed Jul. 17, 1998, the entire disclosures of which are included herein by reference. This application is also a continuation in part of application Ser. No.09/694,708, filed Oct. 23, 2000, abandoned, which is a continuation of Ser. No. 09/290,483, filed Apr. 12, 1999 and issued Oct. 24, 2000 as U.S. Pat. No. 6,135,170, which is a division of Ser. No. 08/897,015, filed Jul. 18, 1997 and now abandoned, both to Charles A. Arnold, the entire disclosures of which are also included herein by reference.

FIELD OF THE INVENTION

This application relates to aqueous suspensions of polyacrylamide and its uses, in particular for soil conditioning.

BACKGROUND OF THE INVENTION

Water-soluble polyacrylamide (PAM) and other water-soluble polymers are used as soil conditioners because they help form and protect soil aggregates by binding to clay particles in the soil. Among the benefits, this characteristic helps to control wind and water erosion, improve water infiltration and retention, improve soil aeration, and inhibit crusting or sealing. One use is in forestry, wherein granules of PAM are mixed into soil into which seedlings are planted. Water-soluble PAM is a long-chain molecule, which is distinguished from an insoluble cross-linked form of PAM. This disclosure relates to the water-soluble variety of PAM, which will also be referred to herein simply as PAM.

Water-soluble PAM with the most desirable properties for soil conditioning has a molecular weight of about 15–22 million a.u. (atomic units), and is about 20% anionic. Water-soluble PAM of this molecular size is commercially available in granule sizes of about +60, −25 mesh (between 250 and 600 $\mu$m), and, more typically, essentially not smaller than +40 mesh (>450 $\mu$m) sizes. PAM of this type, which comprises an anionic linear copolymer of acrylamide and sodium acrylate, is available under the trade name FLO-BOND A30 from Chemtall, Inc. of Riceboro, Ga. The water-soluble granules appear to be aggregates of many molecules and have a very irregular shape. When viewed under an optical microscope, flat crystal faces are visible, and the particles appear translucent. Some small portions of the granules appear darkly transparent. The granules are probably not entirely clear because of included fractures and other defects, which will scatter light.

Severe barriers exist to more widespread use of water-soluble PAM in soil. When dry granules of PAM of standard commercial sizes are applied to agricultural soil at reasonable economic rates, the soil typically is nonuniformly conditioned because the dry granules are too far apart to fully condition soil. For example, when 10 pounds (4.5 kg) of the standard size water-soluble PAM is mixed into an acre of soil to a uniform depth of six inches (15 cm), each pound (0.45 kg) of soil will contain on average only about 22 particles of water-soluble PAM. Each ounce (28.4 g) of soil would contain only about 1–2 particles.

Applying water-soluble PAM in solution is more effective than dry granule application because it produces a more uniform spatial distribution of the PAM in the soil. Therefore, solution application requires less PAM than does application of granules for favorable results. Another benefit of using a solution of PAM is that it can be applied to soil through standard irrigation lines. Full solution time for standard size granules is typically an hour or more, but many dealers and manufacturers state that it is best to allow the water-soluble PAM to sit overnight in water to fully dissolve for most large scale agricultural purposes.

Generally, stock solutions of around 2,000 to 3,000 parts per million (ppm) by weight (mg/liter) water-soluble PAM in water are the most concentrated that can be conveniently obtained with conventional procedures. When some fertilizer salts are included, somewhat higher concentrations, e.g., up to about 12,000 ppm are possible. The presence of fertilizer solutes will also help PAM go into solution somewhat more rapidly. For example, solution concentration can be improved by dissolving PAM in various fertilizer salt solutions, as described in U.S. Pat. No. 4,797,145, to Wallace, et al. However, the solution rate generally remains slower than desirable because of the large particle sizes. An hour or more is typically required to achieve the higher concentrations even with the use of fertilizer salts.

Co-application of dry PAM with some divalent calcium helps the water-soluble PAM to bridge with or react with clay to add stability to soil aggregates, as described in *Need for Solution or Exchangeable Calcium For Critical EC Level for Flocculation of Clay by Polyacrylamides*, by Wallace and Wallace, in Proceedings: Managing Irrigation Induced Erosion and Infiltration with Polyacrylamide, Univ. Idaho Misc. Pub. No. 101–96, pp. 59–63, 1996. This enhances the soil conditioning value. To achieve this, solution-grade gypsum of −200 mesh particle size (−75 $\mu$m), which is typically composed mostly calcium sulfate dihydrate, can be applied to soil before adding water-soluble PAM, or gypsum and water-soluble PAM can be applied together in solution after each is dissolved separately. But gypsum also has a low solubility, which limits its use.

Using water-soluble PAM in solution for liquid application to soil entails high handling costs. Because of the low solubility of PAM, large quantities of stock solution are usually required to apply a reasonable amount of PAM to a large field. It generally requires bulk equipment that is not easily portable to fields. The PAM granules in commercially available PAM take a long time (anywhere from over an hour to overnight) to go into solution. Because low PAM concentrations of stock solutions are the rule, large amounts of stock solution are needed for each application. Dissolving the standard commercial-size polymers requires considerable experience. Training is often required to become proficient in getting water-soluble PAM particles into solution. When directions are not followed accurately, failed applications result. If the PAM is not completely dissolved, particles of PAM tend to clump together in agglomerations. These large, undissolved clumps make using solutions of PAM in sprinkler irrigation systems very difficult, if not impossible, as the clumps tend to clog the sprinkler lines and nozzles.

One approach to the time and concentration problems has been to use mechanical devices that meter the water-soluble PAM into a stream of irrigation water. A residence time in a tank of one hour or more to achieve solution before applying the solution to fields is realistic and common. For example, U.S. Pat. No. 5,450,985, to Meuleman, discloses a device that delivers dry water-soluble PAM into a canister and from there into an irrigation water stream, such as an irrigation ditch or canal, after a time period. This system does not produce PAM solutions for injection into sprinkler systems. U.S. Pat. No. 5,580,168, to Alireza, et al., discloses a venturi system for injecting water-soluble PAM first into a dispersion tank and then into an aging tank, which is further agitated before injecting the stock solution into an irrigation system. Solution time for both systems is over an hour, and much too slow for convenience. The size of the granules of Water-soluble PAM that are used commercially is too large to allow faster solution times.

U.S. Pat. No. 5,548,020, to Santini et al., discloses an alternative procedure for putting water-soluble PAM into irrigation lines. A 30% concentrated PAM emulsion product is prepared with kerosene or oil. The flow rate of this product is relatively slow, which decreases its usefulness for sprinkler irrigation systems. Also, this form of PAM emulsion flows into water like a semi-stiff string that requires considerable mechanical agitation by a machine to put into solution. The kerosene or oil is environmentally undesirable. The kerosene or oil adds expense and appears to decrease the effectiveness of the PAM as a soil conditioner, thereby requiring more PAM to be used for the same effect as with an aqueous solution. The water-soluble PAM in the 30% emulsion is considerable more expensive than granular forms of water-soluble PAM to further detract from any advantage it may have.

Water-soluble polymers also have uses in the oil drilling industry. Oil drillers have developed various methods for putting the polymers into solutions. The polymer solutions produced for oil drilling have a high viscosity, which is undesirable for irrigation. The oil drilling solutions are typically produced without any accurate measuring of the amounts of the ingredients, which is not appropriate for agriculture. For these reasons, the oil drilling industry methods are not applicable to the aqueous requirements for solution of water-soluble APM for agricultural use.

It would seem that the time needed for dissolution of water-soluble PAM should be decreased by using smaller particle size PAM however, there is no adequate bulk supply of suitable small particle PAM. Attempts have been made to grind PAM into smaller sizes, such as –100 mesh (<150 μm). However, PAM ground in this way loses many of its desirable properties. For example, the ground PAM flows very poorly, clumping up even when dry. This characteristic is undesirable in a metering system. The poor flow and clumping is probably because the grinding has made the PAM irregularly shaped. When observed with an optical microscope, the particles are entirely opaque. Most particles do not appear to have clean, flat faces, as with the larger, commercial grade particles. These ground particles also tend to form clumps in water, which are difficult to dissolve. Many particles remain visible and undissolved in water even after an hour or more. The solution formed from the dissolved particles is less viscous than a solution produced with a like concentration of PAM that was not ground. This suggests that the grinding process has broken many of the large polymeric molecules. Analysis of the ground particles confirms that the molecular weights are reduced to less than one million a.u., and typically less than a few hundred thousand a.u. Such smaller-chain particles are not as effective for soil conditioning, and so more must be used to achieve the same result. In addition, the known process for grinding the PAM granules includes freezing the granules, which adds to the cost and complexity of the procedure.

Small quantities of small particle size water-soluble PAM can be obtained by screening the generally large-granule PAM from commercial sources. This is a laborious process that does not yield sufficient quantities to be commercially cost effective. The screened fines are very similar in appearance to the larger size, commercial grade PAM. When observed with an optical microscope, the particles are translucent, which may be due to fractures included in the particles. About 40–60% of the particles appears to have areas that are transparent. When added to plain water, the particles do not disperse or dissolve well. Some of the particles appear to clump together. Many of the particles remain undissolved and visible, even after ten minutes of stirring or agitation. The screened fines also have poor flow characteristics when dry.

BRIEF SUMMARY OF THE INVENTION

In one aspect, the invention provides a stable suspension of water-soluble polyacrylamide particles in an aqueous medium. The aqueous medium includes a saturated solution of an ammoniated salt that is selected from the group that includes ammonium sulfate, ammonium nitrate, urea, and thiourea. The polyacrylamide particles are –270 mesh particles, which include about 85% –400 mesh particles. The suspension is at least about 2.5%, and can be up to about 15% polyacrylamide by weight, depending upon which salt solution is used. The suspension is stable for at least twelve hours without any visible settling or stratification.

The invention also provides a method of forming a stable aqueous suspension of water-soluble polyacrylamide particles. The method includes the steps of providing a saturated solution of an ammoniated salt, and mixing into the saturated solution polyacrylamide particles comprising –270 mesh particles so that the suspension is between about 2.5% and about 15% polyacrylamide by weight.

The invention, in yet another aspect, provides a method of conditioning soil, including the steps of providing an aqueous suspension of water-soluble polyacrylamide particles that is between about 2.5% and about 15% polyacrylamide by weight, adding the suspension to a aqueous medium, such as irrigation water, and spreading the aqueous medium with the polyacrylamide onto the soil. Adding the suspension to the aqueous medium causes the polyacrylamide to go into solution in less than about a minute, and typically within a few seconds. In this method, the solution of PAM can be spread on the soil by spraying through a nozzle of an irrigator.

The invention provides many advantages over prior art formulations of PAM for soil conditioning. The suspension is easy to mix into saturated solutions of commonly available ammoniated salts, which can be done safely by farmers in the field. The suspension has a very high concentration of PAM in comparison with PAM solutions, which typically do not have PAM concentrations over 0.5% by weight. The PAM suspensions made according to the invention have a relatively low viscosity, particularly in comparison with concentrated PAM solutions and with oil-based PAM emulsions and PAM solutions. Suspensions with PAM concentrations of about 15% or less have a viscosity that is low enough so that they can be used in any irrigation injection system. The PAM in suspension will go into solution almost instantly when added to water. In addition, the PAM suspensions made according to the invention are extremely stable, showing no apparent stratification or separation even after over six months on the shelf.

Other objectives and advantages of the invention will become more apparent from the following detailed description.

DETAILED DESCRIPTION OF THE INVENTION

The invention provides low viscosity, stable aqueous suspensions of water-soluble PAM particles using a flowable form of small particle PAM. The PAM particles are characterized by particle sizes of about −100 mesh (<150 $\mu$m), and preferably −270 mesh (<53 $\mu$m) and more preferably −400 mesh (<37 $\mu$m). When observed under a microscope, about 90% of the small PAM particles exhibit visible transparent regions. These particles are substantially free of defects (such as the fractures seen in screened fines of commercial grade PAM), and have flat crystalline faces.

Water-soluble PAM in this size range can be produced in bulk quantities at low cost by using a resonance disintegration (RD) mill to subject larger size, commercially available granules of PAM to rapidly alternating increasing and decreasing pressures. It is believed that the rapid pressure changes within the RD mill split, cleave, or otherwise break up the granules without significantly roughening their surfaces or changing the character of the polymerized crystals. The RD mill may also be used to produce small particle size gypsum to sizes of about −325 mesh, or to produce other small particulate materials that can be mixed with the PAM for soil conditioning.

An RD mill is described in detail in U.S. Pat. No. 6,135,170, the entire disclosure of which is included herein by reference, and a detailed description of methods of producing the small particle PAM with an RD mill are described in copending patent application Ser. No. 09/356,271, filed Jul. 16, 1999, the entire disclosure of which is also included herein by reference. As such, the details of the RD mill and its operation to produce small particle PAM will not be described in detail in this specification. C. A. Arnold & Associates, Inc. of Englewood, Co. produce RD mills.

In a preferred embodiment, the larger size granules are made of PAM molecules with a molecular weight in a range of about 15–22 million atomic units. It appears that the RD milled, small particle size product is also made of molecules with a molecular weight that is substantially unchanged from the starting material. Smaller or larger molecular weight molecules of PAM may also be used as a starting material for making the small particle PAM, however the PAM particles with molecular weights in the range of 15–22 million a.u. appear to have the best soil conditioning characteristics.

The small particle PAM produced by a RD mill has excellent flow characteristics when dry, and does not clump up, as does small particle PAM made by grinding or the screened fines of prior art commercial grade PAM. This characteristic makes the RD mill produced PAM particularly suitable to be spread directly on soils or mixed into soils as a dry powder. A PAM powder with a size distribution that is about 85% −400 mesh and a RD mill can easily produce 100% −270 mesh, PAM of such small particle sizes is virtually impossible to produce by prior art grinding or screening methods.

One pound (0.45 kg) of such PAM particles when spread into an acre of soil to a depth of six inches provides about 30,000 particles of PAM per pound of soil. This is contrasted with prior art commercial grade PAM (about −35 to +60 mesh), which only provides about 40 particles per pound of soil when spread at the same rate of one pound per 0.5 acre-foot. Because the small particle PAM provides so many more particles per pound of soil, it is more effective for soil conditioning than the prior art large particle size PAM, and so less may be used per application. In a field test, where in the past a farmer would use about 80 pounds of PAM per acre in each of two applications in a growing season, crop yield was improved by applying the micronized PAM powder (about 85% −400 mesh, 100% −270 mesh) at a rate of about 3–5 pounds per acre in a single application.

Small particle PAM produced by a RD mill can also be used to make a solution for spreading with a standard type of sprinkler or drip irrigation system. When added to plain tap water, or even distilled water, the small particles of PAM produced by the RD mill will essentially all dissolve within about 10 seconds or less, producing a clear solution. As used herein, "essentially all dissolved" means that the resulting near-instantaneous solution is fully usable and has no visible undissolved particles or clumps, even when observed as a thin film.

By mixing the small particle PAM in a solution containing divalent or monovalent cation salts, and particularly divalent calcium salts, small particle size PAM goes into solution almost instantaneously and more concentrated PAM solutions than with water alone can be obtained. Near instantaneous, (e.g., in a few seconds), high concentration PAM solutions can also be obtained with small PAM particles produced by grinding or screening the larger size commercial grade particles. However, such small PAM particles produced by grinding or screening generally have much lower molecular weights, e.g. less than about 0.5 million a.u., and more defects, and therefore do not have the soil conditioning properties or the flow characteristics of small particle PAM produced by an RD mill.

The small particle PAM produced with the RD mill can also be used to make a stable aqueous suspension. The suspension is made by first producing or providing a saturated solution of an ammoniated salt. Then, small particle PAM produced by RD mill is mixed into the saturated solution, preferably by stirring or agitating the solution as the PAM is added. PAM concentrations of at least about 2.5% by weight can be obtained by this method.

The small particle PAM produced by a RD mill is particularly well suited for producing the PAM suspensions for several reasons. For producing the PAM suspensions, the particle size is preferably −270 mesh (<53 $\mu$m) and more preferably −400 mesh (<37 $\mu$m). The −270 mesh PAM produced by a RD mill is actually about 85% −400 mesh particles, and works very well for making PAM suspensions. The PAM particles produced by a RD mill have all the soil conditioning characteristics of larger size stock granules from prior art. Even −400 mesh particles produced with the RD mill still have molecular weights in a range of about 15–22 million a.u.

The ammoniated salt can be ammonium sulfate (($NH_4$)$_2SO_4$), ammonium nitrate ($NH_4NO_3$), urea ($NH_2CONH_2$), thiourea ($NH_2CSNH_2$), or any other ammoniated salt. For example, small particle PAM can be added to a standard 32-0-0-0 liquid fertilizer, the primary part of which is a saturated solution of ammonium nitrate. Table 1 provides usable weight percentages of PAM that can be obtained with each suspension. Higher PAM concentrations in such suspensions can be achieved, but such higher concentration suspensions do not flow as well, which decreases their usefulness for mixing into irrigation water or applying directly to soils.

TABLE 1

| | |
|---|---|
| $(NH_4)_2SO_4$ | 15% |
| $NH_4NO_3$ | 5% |
| $NH_2CONH_2$ | 5% |
| $NH_2CSNH_2$ | 2.5% |

In one example of a method for preparing a suspension, adding about 7.5 pounds (3.4 kg) of ammonium sulfate to each gallon of water first produces a saturated solution. Then, about 0.5 pounds (0.23 kg) of 100% −270, 85% −400 mesh PAM is slowly added to the saturated solution while agitating the solution. It is best to continue agitating the mixture for a couple of minutes. This produces a PAM suspension that is about 3.2% PAM by weight. The PAM suspensions made with −270 mesh or smaller PAM particles are extremely stable, i.e. the PAM particles do not stratify of settle. There is no visible change in the suspension after sitting on a shelf for six months. In one test, a PAM suspension was brought to a boil, cooled until the salts started to precipitate out of solution, cooled further to about 0° C., and then brought back to ambient temperature so that the salts went back into solution. After all this, the PAM was still in suspension. It appears that the PAM particles served as nucleation sites for the precipitating ammonium salts. Larger size PAM particles, up to about −100 mesh, can also be used, but the suspensions made with 150 mesh or larger particles tend to stratify.

PAM suspensions made with different salts have different viscosity. Suspensions made with ammonium sulfate appear to have a relatively low viscosity, which is advantageous when pouring or injecting the suspension into irrigation water. Ammonium sulfate-PAM suspensions with PAM concentrations of about 6% by weight flow almost as well as plain water, and still flow very well even at a PAM concentration of about 15% by weight. This is a clear indication that the PAM is not at all dissolved in the ammonium salt solution, because PAM solutions are viscous and gel-like at even low concentrations.

The PAM particles in the described suspensions rapidly dissolve in less than a minute, and typically almost instantly, when added to water or to other unsaturated salt solutions. It appears that the PAM goes into solution as fast as the suspension can be added to the unsaturated aqueous medium. It does this without clumping, as can happen when using commercial grade, large particle PAM or small particle PAM not produced by a RD mill. The suspension can be directly added to irrigation water, thereby creating a solution of PAM. The dilute PAM solution is suitable for spreading on soil by spraying the solution through a nozzle of an irrigator or applying through a drip irrigator.

In one example, a suspension containing up to one pound (0.45 kg) of PAM can be added per 10 gallons of most liquid fertilizer blends. This mixture will slightly thicken the liquid fertilizer but can still be pumped about as easily as the liquid fertilizer blend alone. For best results, the PAM suspension is slowly added to the liquid fertilizer blend through an inductor while maintaining extreme agitation.

Other soil conditioners, such as calcium salts, other fertilizer salts, and gypsum, can be added to the dilute solution, either before or after mixing in the PAM suspension. The calcium salt can include calcium nitrate ($Ca(NO_3)_2$), calcium thiosulfate ($CaS_2O_3$), and calcium chloride ($CaCl_2$). The fertilizer can include potassium salts (e.g. potassium phosphate and potassium nitrate) in addition to ammonium salts. Other salts such as potassium salts and magnesium salts can also be used in the dilute solution.

Another use for the high concentration PAM suspensions is for stabilizing embankments and earthen structures that are subject to erosion or collapse when saturated. These may include man-made structures such as earthen dams, levees, irrigation canals, and the like, and also natural and man-made hillsides. The PAM suspensions can be sprayed directly on earthen structures in high enough concentrations to be effective in holding the soil and reducing the rate of lateral water seepage through the structure. For example, to control erosion of raised planting beds sue to irrigation, a suspension of PAM and gypsum in a saturated ammonium sulfate solution is sprayed directly on the beds at a rate of 20 pounds (9.1 kg) of PAM per acre. A benefit of maintaining the integrity of the beds is that plant pathogens, such as the fungus phytophthora.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A stable suspension of water-soluble polyacrylamide particles in an aqueous medium.

2. The suspension of claim 1, wherein the aqueous medium comprises a saturated solution of an ammoniated salt.

3. The suspension of claim 2, wherein the ammoniated salt is selected from the group that consistsb of ammonium sulfate, ammonium nitrate, urea, and thiourea.

4. The suspension of claim 2, wherein the ammoniated salt solution is in the form of a liquid fertilizer.

5. The suspension of claim 1, wherein the polyacrylamide particles comprise −270 mesh particles.

6. The suspension of claim 5, wherein the −270 mesh particles comprise about 85% −400 mesh particles.

7. The suspension of claim 1, wherein the suspension comprises at least about 2.5% polyacrylamide by weight.

8. The suspension of claim 7, wherein the aqueous medium comprises a saturated solution of an ammoniated salt.

9. The suspension of claim 8, wherein the ammoniated salt is selected from the group that consists of ammonium sulfate, ammonium nitrate, urea, and thiourea.

10. The suspension of claim 7, wherein the suspension comprises up to about 5% polyacrylamide by weight, and the salt is selected from the group that consists of ammonium sulfate, ammonium nitrate, and urea.

11. The suspension of claim 7, wherein the suspension comprises up to about 15% polyacrylamide by weight, and the ammoniated salt is ammonium sulfate.

12. The suspension of claim 1, wherein the suspension has a viscosity that sufficiently low for use in a spray irrigation system.

13. The suspension of claim 1, wherein the suspension is stable for at least twelve hours.

14. A method of forming a stable aqueous suspension of water-soluble polyacrylamide particles, comprising:

provimide particles, comprising:

providing a saturated solution of an ammoniated salt; and mixing into the saturated solution polyacrylamide particles comprising −270 mesh particles so that the suspension is at least about 2.5% polyacrylamide by weight.

15. The method of claim 14, wherein the salt is selected from the group comprised of ammonium sulfate, ammonium nitrate, urea, and thiourea.

16. The method of claim 14, wherein the ammoniated salt is ammonium sulfate, and the suspension is up to about 15% PAM by weight.

17. A method of conditioning soil, comprising providing a stable aqueous suspension of water-soluble polyacrylamide particles that is at least about 2.5% polyacrylamide by weight;

adding the suspension to an aqueous medium that is not saturated; and spreading the aqueous medium with the polyacrylamide onto the soil.

18. The method of claim 17, wherein adding the suspension to the aqueous medium causes the polyacrylamide to go into solution in less than about a minute.

19. The method of claim 17, wherein spreading the aqueous medium includes spraying through a nozzle of an irrigator.

20. The method of claim 17, wherein stable suspension comprises a saturated solution of one member from the group consisting of ammonium sulfate, ammonium nitrate, urea, and thiourea.

21. The method of claim 17, wherein the stable suspension comprises a saturated solution of ammonium sulfate, and the suspension is up to about 15% PAM by weight.

22. The method of claim 17, wherein the aqueous medium comprises an unsaturated solution of a soil conditioning salt.

23. The method of claim 22, wherein the soil conditioning salt includes a divalent calcium salt.

24. A stable aqueous suspension of water-soluble polyacrylamide particles in a saturated solution of an ammonium salt, wherein the polyacrylamide particles are characterized by a particle size of about −270 mesh, and wherein the suspension is at least about 2.5% by weight polyacrylamide.

25. The suspension of claim 24, wherein the ammonium salt is ammonium sulfate, and wherein the suspension is about 2.5% −15% by weight polyacrylamide. the locking control system to unlock the vehicle latching mechanism, wherein said light source lights said portion through said handle portion.

* * * * *